UNITED STATES PATENT OFFICE.

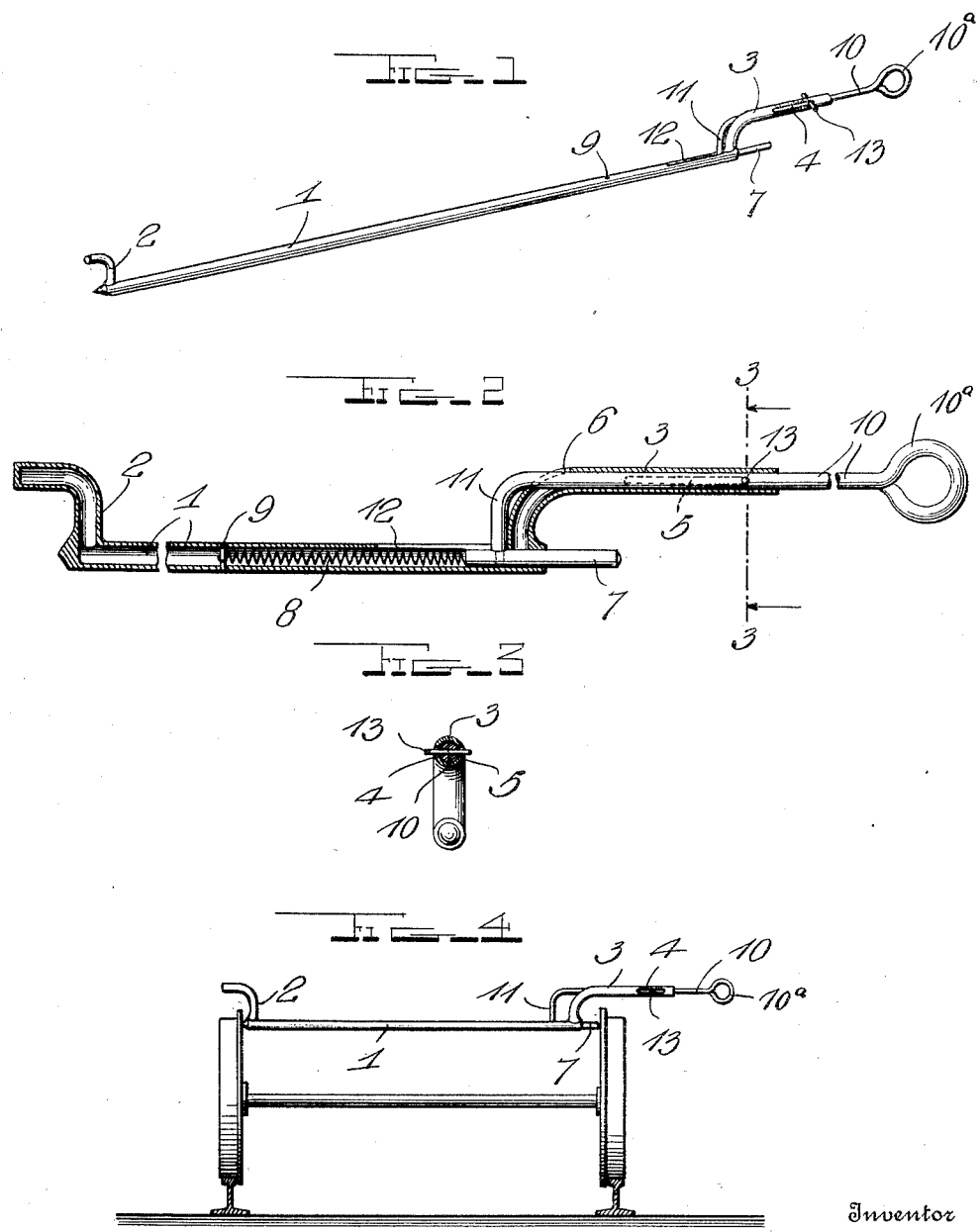

ANTON GOTAUTAS, OF BRAINERD, MINNESOTA.

WHEEL-GAGE.

1,099,794.    Specification of Letters Patent.    Patented June 9, 1914.

Application filed July 21, 1913. Serial No. 780,348.

*To all whom it may concern:*

Be it known that I, ANTON GOTAUTAS, a subject of the Czar of Russia, residing at Brainerd, in the county of Crow Wing and State of Minnesota, have invented certain new and useful Improvements in Wheel-Gages; and I do declare the following to be a full, clear, and exact description of the invention, such as will enable others skilled in the art to which it appertains to make and use the same.

This invention relates to improvements in gages for ascertaining the distance between wheels, tracks and other objects.

One object of the invention is to provide a gage of this character having an improved construction and arrangement of adjustable member and indicating mechanism whereby the distance between the objects may be readily measured and will be accurately indicated.

Another object is to provide a wheel gage which will be simple, strong, durable and inexpensive in construction, efficient and reliable in operation and in which the measurements obtained will be indicated on and may be read from both sides of the device.

With these and other objects in view, the invention consists of certain novel features of construction, and the combination and arrangement of parts as will be more fully described and claimed.

In the accompanying drawings: Figure 1 is a perspective view of my improved gage; Fig. 2 is a longitudinal vertical section thereof; Fig. 3 is a cross sectional view through the tubular arm of the gage and taken on the line 3—3 of Fig. 2; Fig. 4 is an edge view of two car wheels arranged on an axle and illustrating one of the uses for which my improved gage is particularly designed.

My improved gage comprises a body portion 1 which may be of any desired length and constructed in any suitable manner, the same being here shown in the form of a tubular rod having one end closed and the other end open for a purpose hereinafter described. Secured adjacent to the closed end of the body is a right angular offset or laterally projecting stationary jaw or gage member 2 which projects from the end of the body 1 for a suitable distance as shown.

On the opposite end of the body 1 from the gage member 2 is secured a tubular arm 3, the inner end of which is offset or formed at substantially right angles to the body and corresponds to the inner or body engaging portion of the stationary jaw or gage member 2. In the opposite sides of the arm 3 near the outer end thereof are oppositely disposed slots 4 and 5 which extend for a suitable distance in the arm 3 and terminate at their outer ends near the free end of the arm as shown. Along the opposite side edges of the slots 4 and 5 are arranged graduated scales of measurement and indicating the width of the space between the objects measured by the gage. At the inner end of the longitudinal or main portion of the arm 3 or at the point where the same turns inwardly to join the body 1 is formed an opening 6 which communicates with the bore or passage through the arm.

Slidably mounted in the open end of the body 1 is an adjustable gaging or measuring finger 7 the inner end of which is engaged with a coiled projecting spring 8 arranged in the tubular body 1 of the gage and which has its inner end secured to a pin 9 arranged transversely through the body of the gage as shown. Slidably mounted in the tubular arm 3 and having its inner end extended through the opening 6 thereof is a finger operating rod 10, the inner end of which is bent inwardly at substantially right angles to the main portion of said rod and parallel to the inwardly turned or offset end of the arm 3 as shown at 11. The right angular end of the rod 11 projects through and has a sliding engagement with a slot 12 in the adjacent end of the body 1 and the extremity of said end 11 of the rod is rigidly secured to the gage finger 7 adjacent to its inner end as shown. By thus arranging the rod 10 and connecting the same with the finger 7 it will be seen that the latter may be retracted or drawn back into the body 1 against the pressure of the spring 8 thereby shortening the distance between the end of the finger and the opposite or closed end of the body 1 and thus adapting the instrument to be used for obtaining the distance between car wheels, tracks or other objects.

The outer or free end of the rod has formed thereon a suitable handle $10^a$ for conveniently operating the rod and secured in the latter and projecting from the opposite sides thereof is an indicating pin 13, the ends of which extend through the slots 4 and 5 and co-act with the graduated scales of measurement along the edges of said slots thus indicating the distance the finger 7 has been retracted by the rod and the distance between the objects with which the gage is engaged.

In addition to obtaining the inside measurements or the distance between objects in the manner described it is also possible by the use of my improved gage to obtain outside measurements or distances between the outsides of objects which distances are measured by the engagement therewith of the stationary gage member 2 on one end of the body 1 and the right angular inner end 11 of the rod 10, said end of the rod being adjustable and movable inwardly by the rod and outwardly by the spring 8 through its engagement with the finger 7 as will be readily understood. The outside measurements obtained in this manner are also indicated on the graduated scales along the edges of the slots 4 and 5 by the pin 9 in the operating rod 10 in the manner described.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

Having thus particularly described my invention, what I claim is:

1. A gage of the character described comprising a tubular body having on one end a stationary jaw or object engaging member, a gage finger slidably mounted in the opposite end of said body, a tubular arm secured to the last mentioned end of the body, a finger operating rod slidably mounted in said arm and having an operative engagement with said finger whereby the latter is adjusted for engagement with the objects to be measured, said tubular rod supporting arm having thereon graduated indicating scales, and an indicating pin carried by said rod and adapted to co-act with said scales to indicate the adjustment of said finger and the distance between the objects measured.

2. A wheel gage comprising a tubular body open at one end and closed at its opposite end and having in one side thereof adjacent to said open end a longitudinal slot, a stationary jaw arranged on the closed end of said body and projecting laterally at right angles therefrom, a spring projected measuring finger slidably mounted in the open end of said body, a tubular arm having an offset inner end secured to one side of said body of the gage adjacent to its open end and projecting therefrom in the same plane with the stationary jaw at the opposite end of the body, said tubular arm having near its outer end oppositely disposed longitudinal slots, said slots having along their opposite edges graduated scales of measurement, a finger operating rod slidably mounted in said tubular arm and having its inner end turned inwardly and connected with said finger through the slot in the body of the gage, said inwardly turned end of the rod co-acting with the stationary jaw on the opposite end of the body for the purpose of obtaining outside measurements, and an indicating pin carried by said rod and projecting through the slots in said tubular arm and adapted to co-act with said scales of measurement.

In testimony whereof I have hereunto set my hand in presence of two subscribing witnesses.

ANTON GOTAUTAS.

Witnesses:
 HILDING A. SWANSON,
 GOTHFRED S. SWANSON.

---

Copies of this patent may be obtained for five cents each, by addressing the "Commissioner of Patents, Washington, D. C."